United States Patent [19]

Mechler

[11] Patent Number: 5,592,092

[45] Date of Patent: Jan. 7, 1997

[54] PIPE PROXIMITY WARNING DEVICE FOR ACCIDENTAL DAMAGE PREVENTION MOUNTED ON THE BUCKET OF A BACKHOE

[75] Inventor: Mark V. Mechler, Austin, Tex.

[73] Assignee: Gas Research Institute, Chicago, Ill.

[21] Appl. No.: 331,229

[22] Filed: Oct. 28, 1994

[51] Int. Cl.$^6$ .............................. G01V 3/08; G01R 19/02
[52] U.S. Cl. ................................................. 324/326; 324/67
[58] Field of Search ................................ 324/66, 67, 326, 324/329, 262, 260; 364/560, 561; 414/694

[56] References Cited

U.S. PATENT DOCUMENTS

| | | | |
|---|---|---|---|
| 2,131,291 | 9/1938 | Maust | 177/311 |
| 3,171,062 | 2/1965 | Rowe, Jr. | 317/18 |
| 3,190,476 | 6/1965 | Smith et al. | 214/138 |
| 3,528,004 | 9/1970 | Katabami | 324/41 |
| 3,588,687 | 6/1971 | Kohler | 324/41 |
| 3,858,737 | 1/1975 | Senoo | 214/762 |
| 3,907,136 | 9/1975 | Christides et al. | 214/138 |
| 3,911,602 | 10/1975 | Trevathan | 37/86 |
| 3,916,298 | 10/1975 | Ulrich | 324/3 |
| 4,317,079 | 2/1982 | Yamamura et al. | 324/326 |
| 4,337,587 | 7/1982 | Presley | 37/83 |
| 4,491,927 | 1/1985 | Bachmann et al. | 364/561 |
| 4,520,317 | 5/1985 | Peterman | 324/326 |
| 4,600,356 | 7/1986 | Bridges et al. | 414/694 |
| 4,955,437 | 9/1990 | Bohman | 172/1 |
| 5,017,873 | 5/1991 | Rippingale et al. | 324/326 |
| 5,053,702 | 10/1991 | Winchester | 324/262 |
| 5,093,622 | 3/1992 | Balkman | 324/326 |
| 5,196,792 | 3/1993 | Lafaye | 324/262 |
| 5,200,704 | 4/1993 | Clark, Jr. et al. | 324/326 |

FOREIGN PATENT DOCUMENTS

| | | | |
|---|---|---|---|
| 61-93973 | 12/1986 | Japan | 324/326 |
| 2188432 | 9/1987 | United Kingdom | 324/67 |
| 94/17429 | 8/1994 | WIPO | 324/326 |

*Primary Examiner*—Sandra L. O'Shea
*Assistant Examiner*—Roger C. Phillips
*Attorney, Agent, or Firm*—Hopkins & Thomas; Scott A. Horstemeyer

[57] ABSTRACT

A pipe proximity warning device is operable for both cross-line and in-line digging operations to provide a warning to an operator that the bucket of a backhoe is in close proximity to a trace wire on a plastic pipe. The in-line system comprises two sensors located on the bottom of the bucket for detecting a signal on the trace wire. The distance to the wire is determined based upon a ratio of the signals detected by the two sensors. The cross-line system also has two sensors and also employs a ranging system that disables a geometry tracker when the bucket is outside an operable range of distances to the trace wire. From the angles of the boom, stick, and bucket, the geometry tracker determines the horizontal distance x and vertical distance z to the trace wire, both of which may be displayed to an operator in real-time. The sensors for both the cross-line and in-line cases are mounted within a housing that maximizes the sensitivity of the sensors to the signals from the wire and which isolates the sensors from shielding effects of the bucket and from eddy currents on the bucket.

25 Claims, 14 Drawing Sheets

PIPE PROXIMITY WARNING DEVICE FOR ACCIDENTAL DAMAGE PREVENTION MOUNTED ON THE BUCKET OF A BACKHOE

BACKGROUND OF THE INVENTION

1. Field of the Invention

This invention relates to a pipe proximity warning device and, more particularly, to a pipe proximity warning device for preventing accidental damage to plastic gas lines.

2. Description of the Prior Art

Before proceeding with any earth digging operation, the operator of a piece of earth moving equipment should determine whether any lines, such as power lines, cable lines, phone lines, water lines, or gas lines are buried within the area of the dig. If the area does contain such lines, the operator should also determine the location of any such lines to prevent the lines from being damaged. Numerous devices have been designed to assist an operator in locating a buried line.

One type of conventional pipeline detector establishes a circuit between the earth moving equipment and the pipeline. This type of detector monitors the established circuit and sounds an alarm or disables the earth moving equipment when the equipment makes contact with the pipeline. Examples of this type of detector are found in U.S. Pat. No. 2,131,291 issued to Maust, U.S. Pat. No. 3,190,476 issued to Smith et al., U.S. Pat. No. 3,911,602 issued to Trevathan, and U.S. Pat. No. 3,916,298 issued to Ulrich. A disadvantage of this type of detector is that some damage may already have occurred to the pipeline by the time the detector signals that the earth moving equipment has contacted the pipeline. Furthermore, with this type of detector, the pipeline to be detected must be formed of a metallic or electrically conductive structure.

Another type of prior art proximity detector employs a transmitting antenna and a receiving antenna to locate underground metallic structures. Some examples of this type of detector may be found in U.S. Pat. No. 3,858,737 issued to Senoo and in U.S. Pat. No. 4,600,356 issued to Bridges et al. While this type of detector is able to detect the pipelines prior to any contact with the pipeline, the detector still requires the pipeline to be formed of a metallic or conducting material. Additionally, this type of detector does not provide an accurate location of the pipeline but instead only indicates the presence of a metallic structure.

Recently, the installation of gas lines has been performed using plastic pipelines. As a result, the conventional proximity sensors which detect metallic pipes are unable to detect the presence of the plastic pipeline. To enable the detection of the plastic pipelines, the plastic lines are generally installed with a metallic trace wire which is placed in parallel and close to the plastic pipeline.

By scanning the area with a hand held instrument, an operator can then estimate the location, course, and depth of the plastic pipelines, The hand held instrument contains a receiver for detecting a radio frequency (RF) signal induced on the metallic trace wire. The instrument, however, only indicates the presence of the trace wire and only provides a rough estimate of the location of the plastic gas lines. The use of the hand held device is often inaccurate, time consuming, and lowers the productivity of the digging operation. Moreover, even with a rough estimate of the wire's location, the gas lines would still become damaged by the backhoe because of the inaccuracy of the instrument and because of errors in judgement on behalf of the backhoe operator.

A system disclosed in U.S. Pat. No. 3,907,136 to Christides et al. may be used to prevent damage to the plastic gas lines. The system comprises a plurality of inductor coils 38 mounted into the teeth 37 of a bucket 18 for detecting a signal on the trace wire buried with the plastic gas line. The system compares signals from adjacent inductor coils 38 and will sound an alarm when the difference between any two adjacent signals is greater than a first threshold level and will also automatically stop the machine when the difference between any two adjacent signals is greater than a second threshold level.

The system disclosed in Christides et al., however, is prone to several disadvantages. For instance, the system is highly dependent upon the magnitude of the signals on the trace wire. When the signals on the wire are relatively large in magnitude, the differences between two adjacent signals from inductor coils 38 will exceed the fixed thresholds at distances further from the wire than when the signals on the wire are relatively small in magnitude. Thus, the system cannot indicate the distance to the wire and cannot provide a warning or stop the backhoe at constant distances to the wire. As a result, the digging may have to be performed by hand sooner than necessary, thereby lowering the efficiency of the digging operation.

In addition to not being able to indicate the distance to the wire, the system is also not able to indicate the location of the wire. Consequently, when the system provides a warning, the operator does not know whether the wire is located directly beneath the bucket 13 or at any other angle into the surface of the earth. The efficiency of the digging operation is therefore lowered due to the unknown direction of the trace wire.

Thus, there is a need in the prior art for a pipe proximity warning device that accurately detects the presence and location of plastic gas lines. There is also a need in the prior art for a pipe proximity warning device that indicates the distance and direction from the earth moving or other equipment to a plastic pipe and a device that warns an operator that the digging operation is approaching the plastic pipe. Additionally, there is a need in the prior art for a pipe proximity warning device that need not rely upon a hand held instrument which only roughly locates the pipe.

SUMMARY OF THE INVENTION

It is an object of the present invention to determine accurately the direction from a piece of earth moving equipment to a buried pipe.

It is also an object of the present invention to indicate to the operator the distance from a piece of earth moving equipment to a buried pipe.

It is yet a further object of the present invention to prevent a plastic pipeline from being accidentally damaged.

Additional objects, advantages and novel features of the invention will be set forth in the description which follows, and will become apparent to those skilled in the art upon reading this description or practicing the invention.

To achieve the foregoing and other objects, the present invention, as embodied and broadly described herein, comprises a locating system for use with an object operating in the vicinity of a field generating device. The locating system is used to prevent accidental damage to the field generating device and comprises a first sensor mounted on the object for detecting the field from the device and for generating a first sensor output signal. The locating system also has a second sensor mounted on the object, at a distance from the first sensor, for detecting the field from the device and for generating a second sensor output signal.

The locating system has a processor that receives the first and second sensor output signals and determines a distance from the object to the device based upon a ratio of the first sensor output signal to the second sensor output signal.

In a preferred embodiment, the object is a backhoe and the first and second sensors are mounted on a bucket of the backhoe. The locating system is operable for both an in-line digging operation and a cross-line digging operation. The field generating device is a conductive wire that generates a magnetic field.

A second aspect of the invention relates to a sensor for use on an object operating in the vicinity of a field generating device. The sensor comprises a core material, a plurality of turns of wire wrapped around the core material, and a sensor housing. The sensor housing has a lower housing portion forming a bottom wall and part of four side walls of the sensor housing and has an upper housing portion forming a top wall and the remaining part of the four walls of the sensor housing. The sensor housing is fabricated from a material having a permeability approximately equal to 1.0 and the upper housing portion is insulated from the lower housing portion.

Another aspect of the invention relates to a method of locating the distance and direction from an object to a field generating device. The method comprises the steps of detecting at a first location on the object a field generated by the field generating device, producing a first sensor output signal, detecting at a second location on the object the field generated by the field generating device, and producing a second sensor output signal. The method also comprises the steps of receiving the first sensor output signal and the second sensor output signal at a processor and determining the distance and direction from the object to the field generating device based upon a ratio of the first sensor output signal to the second sensor output signal. The distance and direction from the object to the field generating device is then displayed.

BRIEF DESCRIPTION OF THE DRAWINGS

The accompanying drawings, which are incorporated in, and form a part of, the specification, illustrate certain preferred embodiments of the present invention and, together with the description, serve to explain the principles of the invention. In the drawings.

DETAILED DESCRIPTION OF THE PREFERRED EMBODIMENT

Reference will now be made in detail to the preferred embodiments of the invention, examples of which are illustrated in the accompanying drawings.

The operation of the invention is described below with a backhoe being used as an example of the piece of earth moving equipment. It should be understood that the invention may be embodied in other types of apparatus, such as other types of earth moving equipment, where the operator would need to know the location of a buried plastic pipeline or the location of a signal carrying wire. Also, for the purposes of the description, it will be assumed that the plastic pipeline has a signal carrying wire affixed to the pipeline or has the wire buried a fixed distance above the plastic pipeline. The invention, however, is not limited to the detection of signals on a wire but may alternatively be used to locate other field generating objects, such as a metallic pipe.

Since the location of a buried pipe is unknown, the digging operation might proceed in any direction with regard to the length of the pipeline. For the purposes of this description, the invention is first described for the situation where the backhoe performs a digging operation in-line with the length of the plastic pipeline and then provides a description for when the backhoe performs a digging operation across the length of the plastic pipeline. These two digging operations are respectfully termed an in-line digging operation and a cross-line digging operation.

Figure 1:
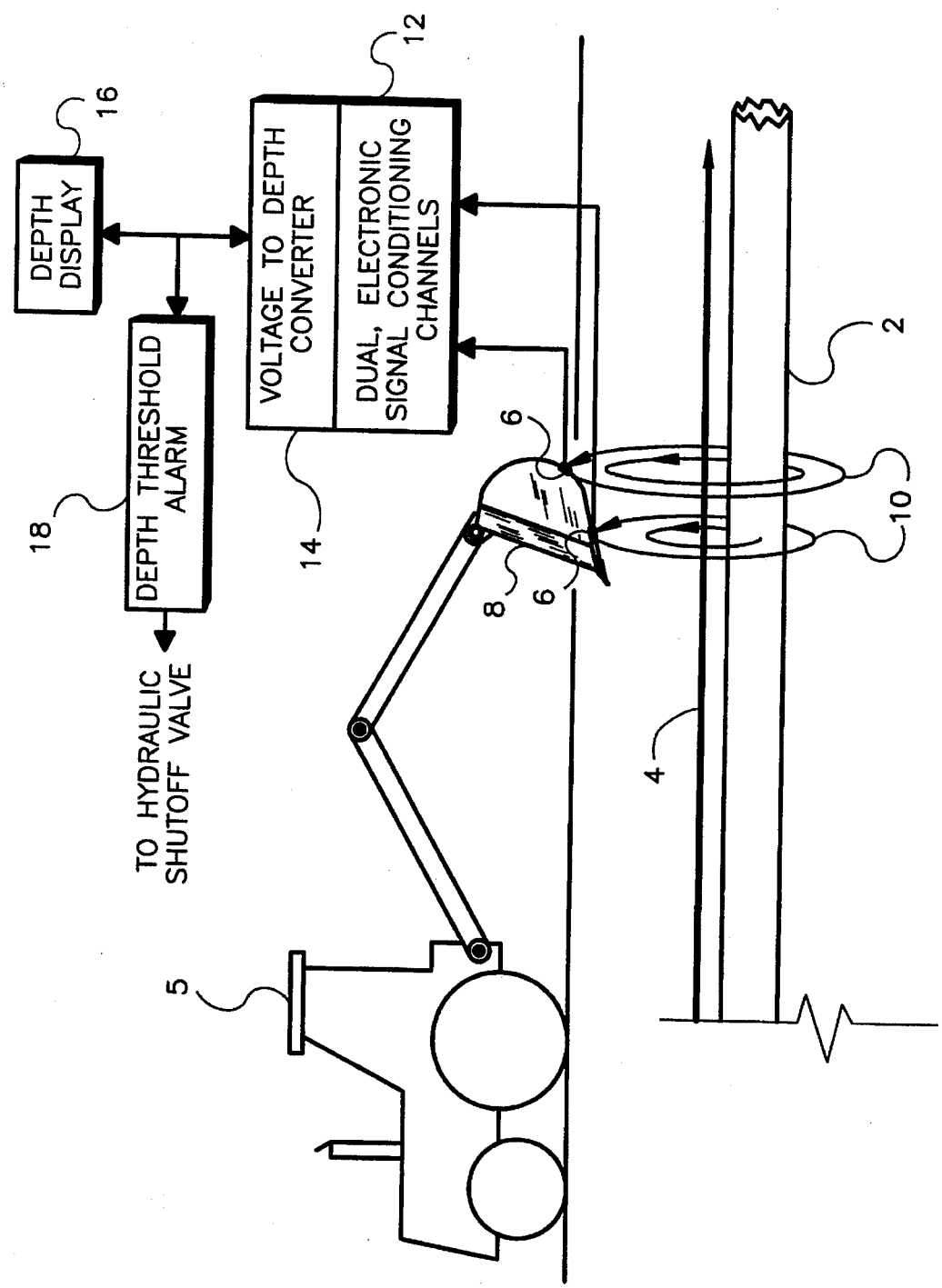
FIG. 1 is a diagrammatic view of a preferred embodiment of an in-line system for determining distances to a trace wire.

In one embodiment of the invention, as shown in FIG. 1, a plastic gas pipe 2 is buried beneath the surface of the earth and has a trace wire 4 located above and along the length of the pipe 2. The trace wire 4 may be directly connected to an electrical source of power for application of a signal to the wire 4 or, alternatively, a signal may be induced onto the wire 4 by a transmitting antenna. The transmitting antenna, not shown, may be formed integral with the pipe proximity warning device or may be in the form of a separate device.

A pair of sensors 6 are installed on the bucket 8 of a backhoe 5. The sensors 6 are oriented so as to detect magnetic flux lines 10 produced by the signal on the trace wire 4 and generate signals which are supplied to a dual channel processing circuit 12 for signal processing. A voltage to depth converter 14 determines a depth of the trace wire 4 and plastic pipe 2 based upon the signals from the dual channel processing circuit 12.

The determined depth of the plastic pipe 2 is indicated to an operator of the backhoe 5 at a depth display 16 which may, for example, be mounted in the cab of the backhoe 5.

The determined depth signal is also supplied to a depth threshold alarm 18 which controls a hydraulic shut-off valve so as to disable the backhoe 5 once the bucket 8 comes within a predetermined distance to the pipe 2. In addition to disabling the backhoe 5, the depth threshold alarm 18 may alert the operator that the bucket 8 is within certain distances to the wire 4 and pipeline 2 to thereby warn the operator that the digging operation is approaching the pipeline 2.

Since the bucket 8 is formed of a metallic material, the bucket 8 presents two obstacles in the detection of the trace wire 4 signal by the sensors 6. The first obstacle is that the trace wire 4 induces eddy currents on the surfaces of the bucket 8. Without proper shielding from these eddy currents, the eddy currents could prevent the sensors 6 from detecting signals from the trace wire 4 and could thereby prevent the sensors 6 from determining the location of the pipe 2. Consequently, the design of the sensors 6 must be provided with sufficient shielding from the eddy currents.

Another obstacle presented by the bucket 8 is that the bucket 8 could shield trace wire 4 signals from reaching the sensors 6. When the bucket 8 is interposed between the trace wire 4 and the sensors 6, the bucket 8 effectively shields the sensors 6 from the trace wire 4 at distances close to the trace wire 4. Thus, the sensors 6 must be precisely located to minimize the shielding effect of the bucket 8.

Figure 2:
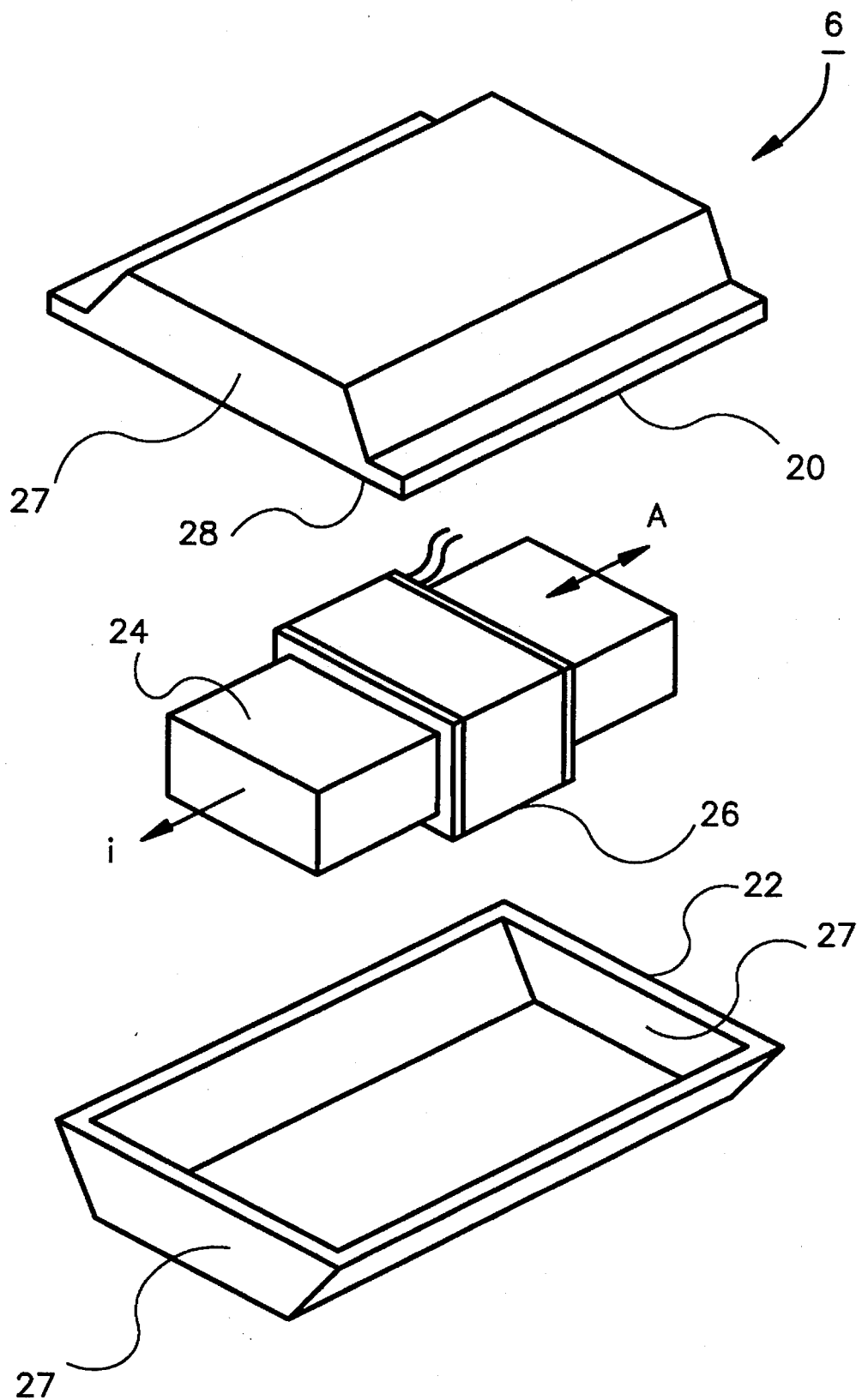
FIG. 2 is an exploded view of a preferred embodiment of a sensor housing.

Referring now also to FIG. 2, an embodiment of the sensor 6 comprises an upper housing portion 20, a lower housing portion 22, and turns of wire 26 about a ferrite core 24. Preferably, the sensor 6 has 3,000 turns of wire wrapped around a ferrite core 24 that is 3.0 inches in length and 0.4 inches in diameter. The turns of wire 26 and ferrite core 24 are encapsulated within the housing portions 20 and 22 with a compliant form of silicon rubber. The sensor 6 has maximum sensitivity to fields generated along the direction of line A. The surfaces of the sensor housing that are normal to line A are termed the windows 27 of the housing.

A hole is cut in the bucket 8 and a flange 28 is formed on the upper housing portion 20 for bolting the housing to the bucket 8. The sensor housing 20 and 22 is preferably fabricated from Series 316 stainless steel which has a permeability close to unity in order to match the permeability of air. By matching the permeability of the sensor housing as close as possible to that of air, the housing does not act as a low reluctance path shunting the flux component around the ferrite core 24.

The sensor housing is designed to de-couple the sensor 6 from any current and flux propagating through the bucket 8. The surfaces of the flange 28 are at a right angle to the flux windows 27 and air gaps are inserted between the flux windows 27 and the bucket 8. The function of the air gaps is to isolate the sensor housing from the eddy currents generated on the bucket 8. The upper and lower housing portions 20 and 22 are completely insulated from each other to prevent a current loop from forming through the two housing portions 20 and 22. As a result of these protections, a high reluctance magnetic path is formed between the bucket 8 and the flux window 27 and the sensitivity of the sensor 6 is substantially increased.

The sensors 6 are preferably mounted to the bucket 8 in an identical manner so that the sensitivity of different sensors 6 is uniform. Because of variances that might be introduced when mounting the sensors 6 to the bucket 8, a metallic plate is preferably mounted to the bucket 8 and the sensor 6 is then mounted to this metallic plate and insulated therefrom. The metallic plate provides a smooth consistent juncture between the bucket 8 and the sensor 6 which results in uniform sensor 6 sensitivity.

Figure 3:
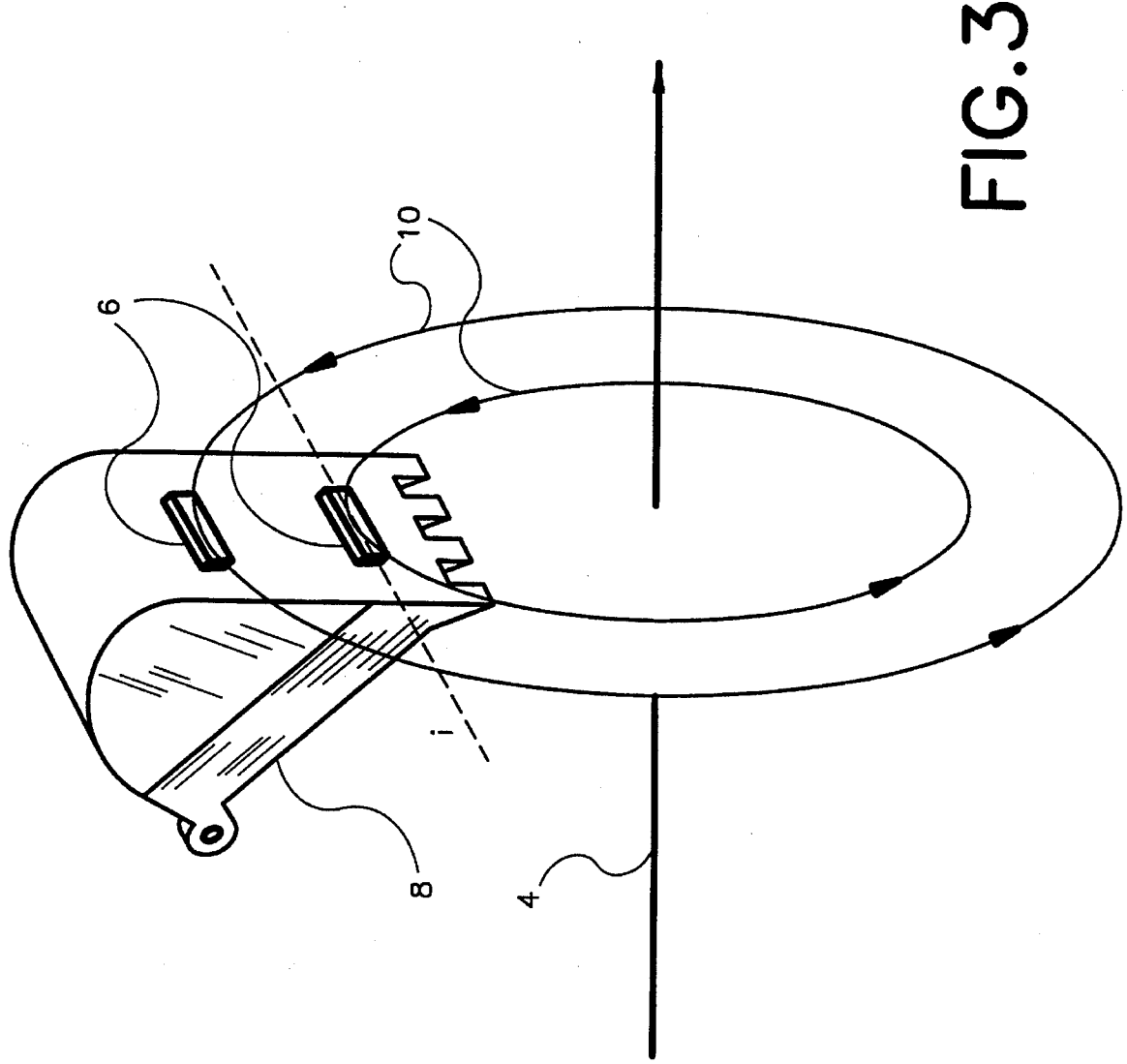
FIG. 3 is an illustration of the preferred sensor arrangement with respect to flux lines for the in-line case.

As shown in more detail in FIG. 3, the flux lines 10 form concentric circles with the length of the wire 4 serving as the center of the circles. To maximize the sensitivity of the sensors 6, the unit vector i normal to the aperture of the turns of the wire 26 is aligned with the direction of the flux lines. In order that the shielding effect of the bucket 8 be reduced, the sensors 6 are preferably mounted to the bottom thereof. Thus, as shown in FIG. 3, the unit vectors i for the sensors 6 are aligned on the bottom surface of the bucket 8 with the flux lines that are tangential to the bottom of the bucket 8 and which travel across the width of the bucket 8.

The distance from the bucket 8 to the trace wire 4 is determined based on the differing strength of the flux that reach the two sensors 6. For instance, assuming that one of the sensors 6 is at a distance z to the wire 4 and the other sensor 6 is at a distance z+d to the wire 4, then the sensor 6 voltage outputs are as follows:

$$E_1 = \frac{K}{z} ; \tag{EQ. 1}$$

$$E_2 = \frac{K}{(z+d)} ; \tag{EQ. 2}$$

where K is a proportionality constant that is the same for both sensors. The ratio of the two voltages is as follows:

$$\frac{E_1}{E_2} = \sigma = \frac{z+d}{z} . \tag{EQ. 3}$$

From Equation 3, the distance z may be determined as follows:

$$z = \frac{d}{\sigma - 1} . \tag{EQ. 4}$$

The proportionality constant K is a measure of the various influences on the output voltage of the sensors, such as the day-to-day variances in the channel gain within dual channel processing circuit 12. Because the proportionality constant K cancels out of the equation for the distance z, the distance z can be determined accurately without regard to these variable influences.

Figure 4:
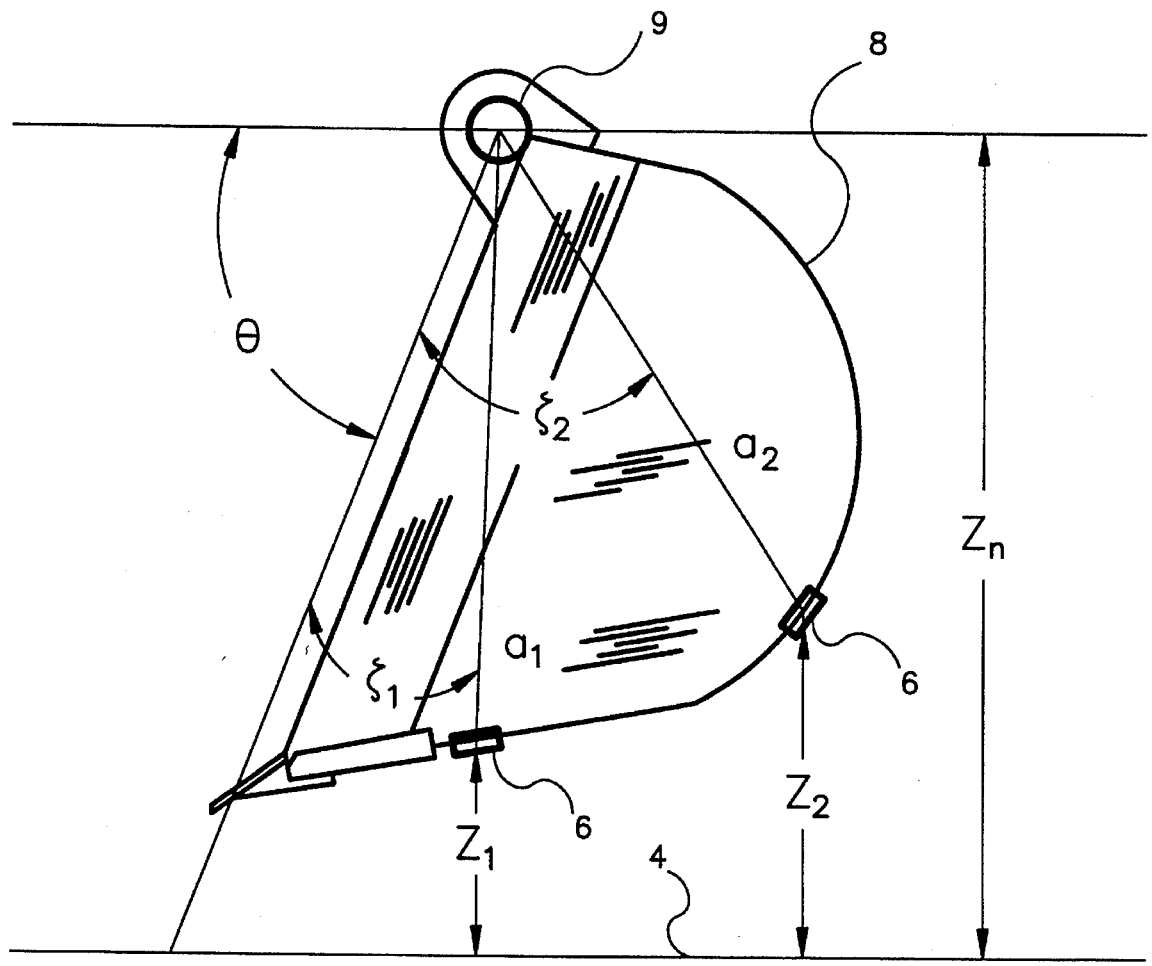
FIG. 4 is a diagram of various angles of the bucket and distances to the trace wire for the in-line case.

As shown in FIG. 4, the shape of the bucket 8 complicates the determination of the distances to the sensors 6. In FIG. 4, the sensors 6 are at radial distances $z_1$ and $z_2$, respectively, from the trace wire 4 and are located at the terminal points of radius lines $a_1$ and $a_2$, i.e., the surface of the bucket. The radius lines $a_1$ and $a_2$ are centered on a hinge 9 of the bucket 8 and are at respective angles $\zeta_1$ and $\zeta_2$ with respect to the edge of the bucket 8. The angle θ, as shown in FIG. 4, is the angle of the bucket 8 with respect to a horizontal plane. From the relationships shown in FIG. 4, the distance $z_1$ can be determined as follows:

$$z_1 = \frac{\sqrt{a_2^2 + a_1^2 - 2a_1 a_2 \cos(\zeta_1 - \zeta_2)}}{\sigma - 1} \sin(\theta - \delta), \tag{EQ. 5}$$

where:

$$\delta = \arctan\left(\frac{a_2 \sin a_2 - a_1 \sin a_1}{a_1 \cos a_1 - a_2 \cos a_2}\right). \tag{EQ. 6}$$

Figure 5:
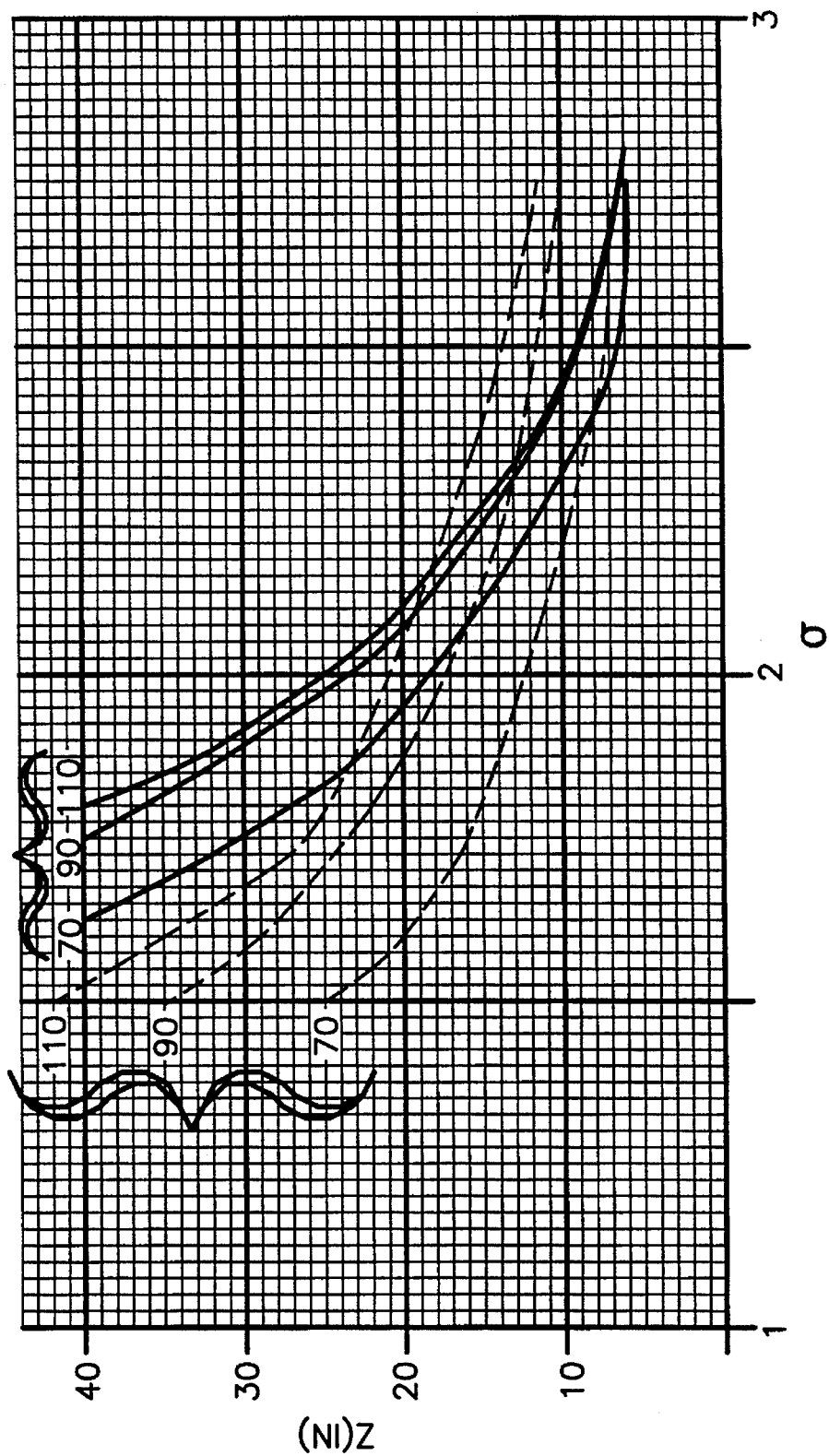
FIG. 5 is a graph of distance versus voltage ratio σ for both calculated and measured values for the in-line case.

The computed values of the distance z at bucket angles θ of 70°, 80°, and 90° and at varying ratios of σ are shown in FIG. 5 with dashed lines. The values shown with solid lines were obtained by measuring the distance z and the ratio of the outputs from the two sensors 6. As shown in FIG. 5, the values calculated according to Equation 5 do not precisely reflect the measured results. A reason for the discrepancies in values is that the structure of the bucket 8 shunts the magnetic field around the sensors 6. As shown in the graph, the errors in the calculated results increase as the distance z decreases and also increase for increasing bucket angles. Because of these discrepancies, Equation 5 is not the best selection for determining distance.

To determine more accurately the distance to the trace wire 4, an equation for the distance to the wire 4 has been derived through polynomial approximation based upon the experimental data shown in FIG. 5. With this method, the distance to the bucket tip $z_t$ from the wire 4 was determined as follows:

$$z_t = z_s - l\sin(\theta - \epsilon) \quad \text{(EQ. 7)},$$

where $z_s$ is the distance to the sensor 6 from the wire 4, l is the length of the bucket extending forward of the sensor 6, and $\epsilon$ is the included angle between the bucket's upper edge and its forward bottom plate. For the backhoe 5, l is equal to 15.4 inches and $\epsilon$ is equal to 43.3°. Using standard interpolation techniques, a second degree Lagrange polynomial is determined as follows:

$$z = \alpha(\theta) + \beta(\theta)\sigma + \gamma(\theta)\sigma^2 \quad \text{(EQ. 8)},$$

where the variables $\alpha$, $\beta$, and $\gamma$ are constants for each value of $\theta$. The values of the constants $\alpha$, $\beta$, and $\gamma$ for each angle of $\theta$ can be ascertained by one of ordinary skill art using well known techniques of numerical analysis.

Figure 6:
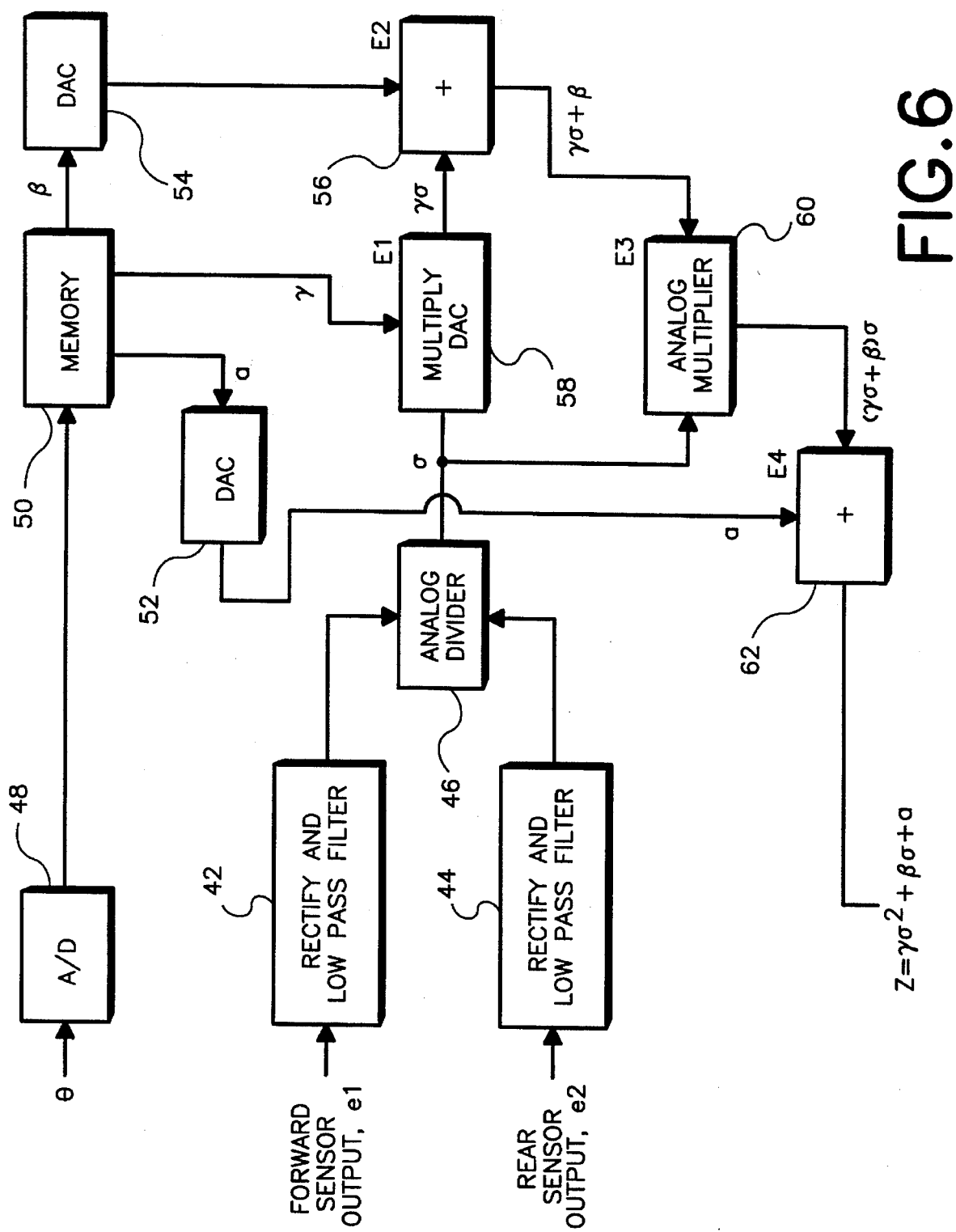
FIG. 6 is a circuit schematic of the preferred conditioning circuitry and voltage to depth converter for the in-line case.

An embodiment of a tracker of the distance to the wire 4 is shown in FIG. 6 in block diagram. The two signals $e_1$ and $e_2$ respectively from the forward and rear sensors 6 are bandpass filtered, rectified, and then low pass filtered at circuits 42 and 44. The circuits 42, and 44 correspond to the dual channel processing circuit 12 of FIG. 1. The two outputs from the circuits 42 and 44 are supplied to an analog divider 46 which determines a ratio of the signals and outputs the variable $\sigma$.

The angle of the bucket $\theta$ is supplied from an inclinometer and is converted into digital form at A/D converter 48. The digital value of the angle $\theta$ addresses values of $\alpha$, $\beta$, and $\gamma$, which differ for each angle $\theta$, within memory 50. The value of $\gamma$ is converted to an analog value and multiplied with $\sigma$ at Multiplier DAC 58 in order to derive a value of $\gamma\sigma$. The value of $\beta$ is converted to digital form at DAC 54 and added at adder 56 with the value of $\gamma\sigma$. The output of adder 56 is multiplied by the value of $\sigma$ at analog multiplier 60 and the output of analog multiplier 60 is added to the value of $\alpha$ at adder 62. The output of adder 62 represents the solution to the polynomial Equation 8 for the distance z.

With the described pipe proximity warning device described in the foregoing, an operator can locate a buried wire 4 and position the backhoe 5 for an in-line digging operation. To detect the trace wire 4, an operator extends the boom of the backhoe 5 and rotates the bucket 8 and notes the area where the signal is a maximum. To determine the course of the wire 4, the bucket 8 is advanced an additional half-boom in length and a second point of maximum sensitivity is noted. After successive operations of finding the area of maximum sensitivity, an operator can determine the course of the wire 4 and position the backhoe 5 for an in-line digging operation.

In contrast to the in-line digging operation, the cross-line digging operation poses some additional obstacles. During a cross-line digging operation, the bucket 8 of the backhoe 5 moves through relatively large distances with respect to the trace wire 4. The range of distances that the backhoe 5 is capable of travelling can easily exceed the capabilities of the tracking system. In other words, the backhoe 5 can move the bucket 8 far enough away from the trace wire 4 that the distances to the sensors are approximately equal. At these far distances, the signals from the sensors are equal to each other and the ratio of the two signals remains at a value of "1" for all distances outside this operable range. Thus, the pipe proximity warning device must operate within a range of distances in which the signals from the sensors differ from each other.

The cross-line digging operation also presents a complexity in that the direction to the trace wire 4 is a dynamic variable. While the direction to the wire 4 for the in-line case digging operation was always vertically downward, the direction to the wire 4 for the cross-line digging operation is affected by the lateral and vertical position of the bucket tip and also by the angle of the bucket.

Figure 7:
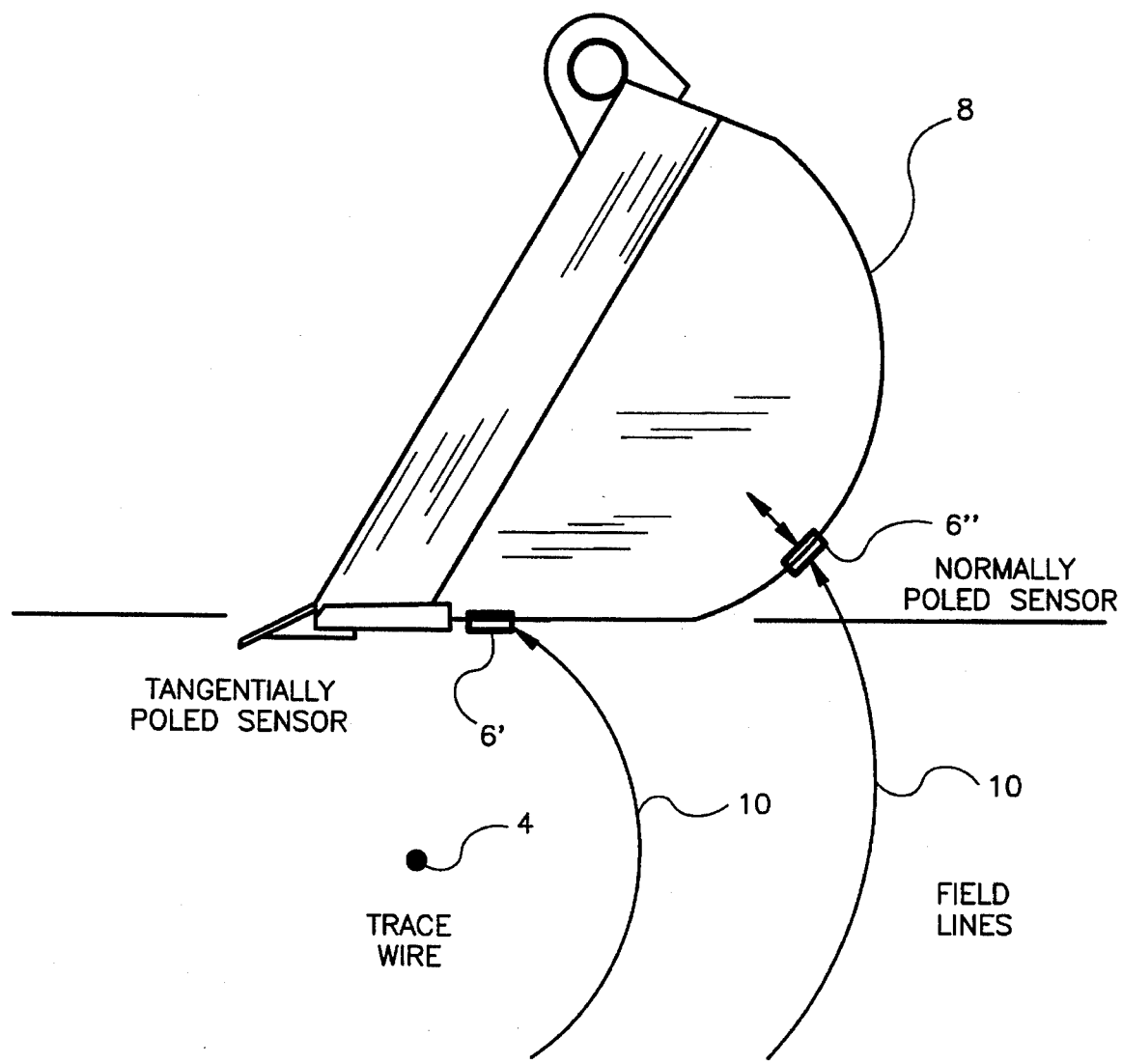
FIG. 7 is an illustration of a preferred sensor arrangement with respect to flux lines for the cross-line case.

The poling arrangement of a sensor refers to the direction of the unit vector i in the sensor with respect to the surface of the bucket 8. The preferred poling arrangement for the cross-line digging operation, as shown in FIG. 7, has a forward sensor 6' tangentially poled to the bottom of the bucket 8 and a rear sensor 6" normally poled to the surface of the bucket 8. As a result of this poling arrangement, the sensors 6' and 6" are more sensitive to the signals from the trace wire 4 at closer distances than they are at distances further away from the trace wire 4. In contrast, for distances further from the trace wire 4, the forward sensor 6' should also have its unit vector i poled normal to the surface of the bucket 8 in order to have maximum sensitivity to the signals on the trace wire 4.

Figure 8A:
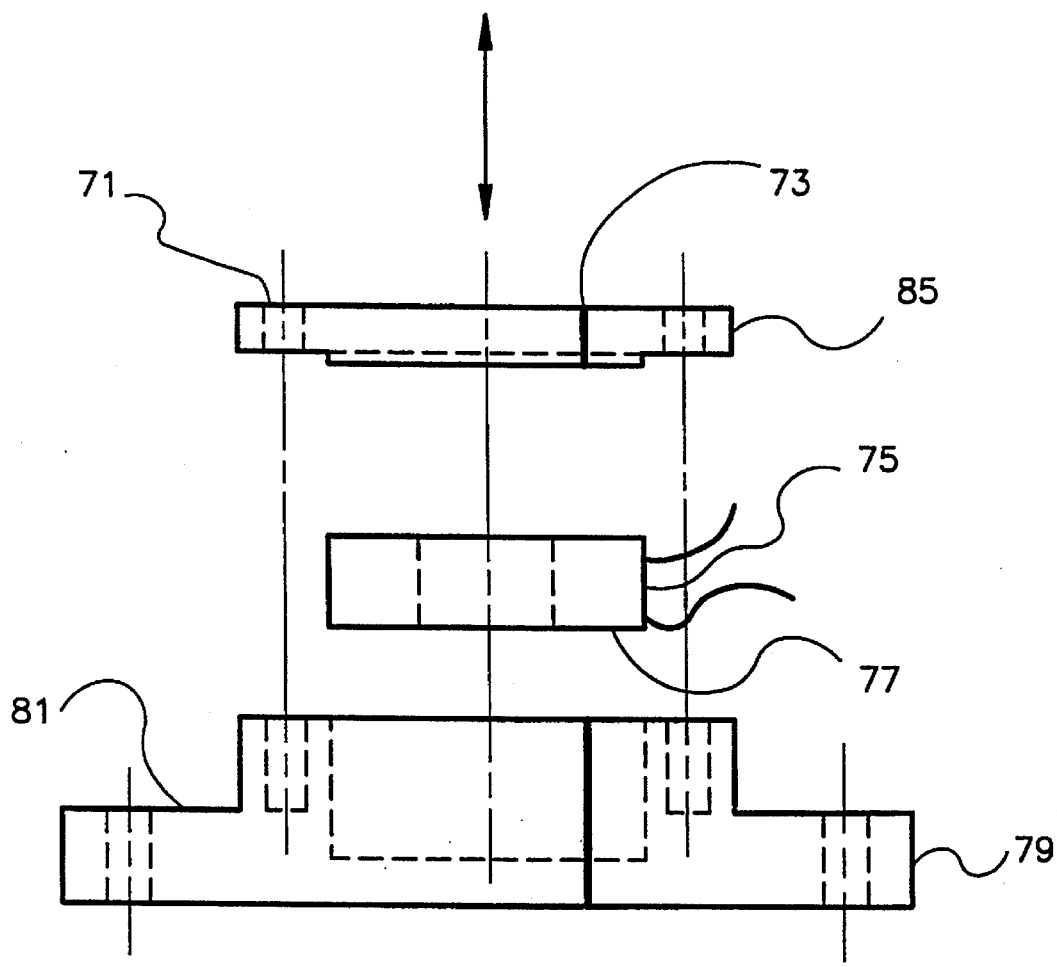
FIGS. 8(A) and (B) are exploded views of a preferred sensor for the cross-line case.
Figure 8B:
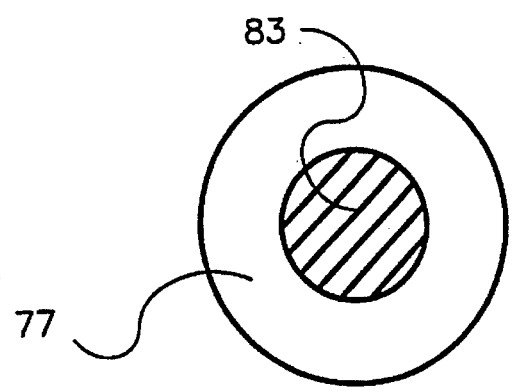

A preferred embodiment of the rear sensor 6" is shown in FIGS. 8(A) and 8(B). The rear sensor 6" comprises a plurality of turns of wire 75 about a core material 83. Preferably, three thousand turns of wire 75 are wound about a plastic bobbin having a ferrite core 83. The rear sensor 6" has an upper housing portion 85 with a bolt flange 71 and a lower housing portion 79 with a bolt flange 81. A circular hole is cut into the bucket 8 and the housing portions 79 and 85 are mounted to the bucket 8 through the hole. To increase the sensitivity of the sensor 6" in the presence of eddy currents generated on the bucket 8, an insulating barrier strip 73 is introduced along a radius line of the sensor housing.

Figure 9:
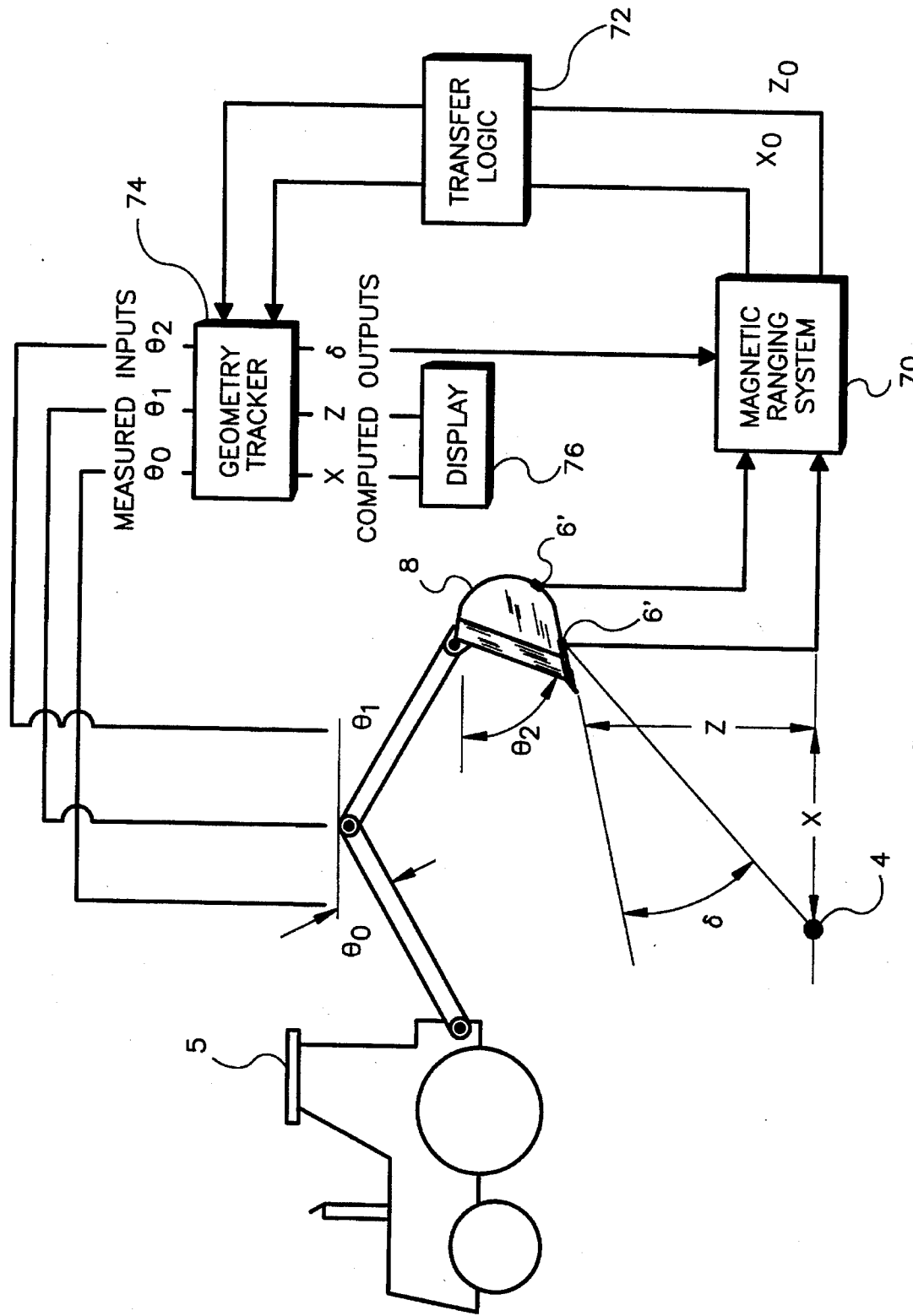
FIG. 9 is a diagrammatic view of a preferred embodiment of a cross-line system for determining distances to a trace wire.

An embodiment of the tracking system for the cross-line digging operation is shown in FIG. 9. The tracking system operates by sensing, in a manner to be explained more fully hereinafter, the angular orientation relative to the ground or horizontal plane of the backhoe's boom, stick, and bucket and computes certain values based upon known lengths of the backhoe 5. The tracking system identifies the location of the trace wire 4 and provides a dynamic display to the operator of the bucket's edge with respect to the trace wire 4.

The cross-line tracking system comprises a magnetic ranging system 70 that receives the signals from the two sensors 6'. A transfer logic circuit 72 transfers the output of the magnetic ranging system 70 to a geometry tracker 74 when the geometry of the system is considered to be optimal. The geometry of the system is deemed to be optimal when the sensors 6' are within a range of distances from the trace wire 4 whereby the geometry tracker 74 can effectively determine the distance to the trace wire 4. At distances outside the optimal range, the distances from the two sensors 6' to the trace wire 4 become approximately equal to each other and the signals from the sensors 6' also become equal to each other. Thus, the system cannot accurately determine the distance to the trace wire 4 outside of this optimal range inasmuch as the difference parameter d in Equations 2 to 4 has been reduced to zero.

The geometry tracker 74 receives the angular data concerning the attitudes of the boom, stick, and bucket 8 and computes the lateral distance x and vertical distance z of the bucket's tip from the wire 4. The magnetic ranging system 70 translates the coordinate system from the rear hinge of the bucket 8 to the center of the trace wire 4 using well known mathematical techniques, i.e. the intersection of the x and y axes is shifted to the wire 4.

Figure 10:
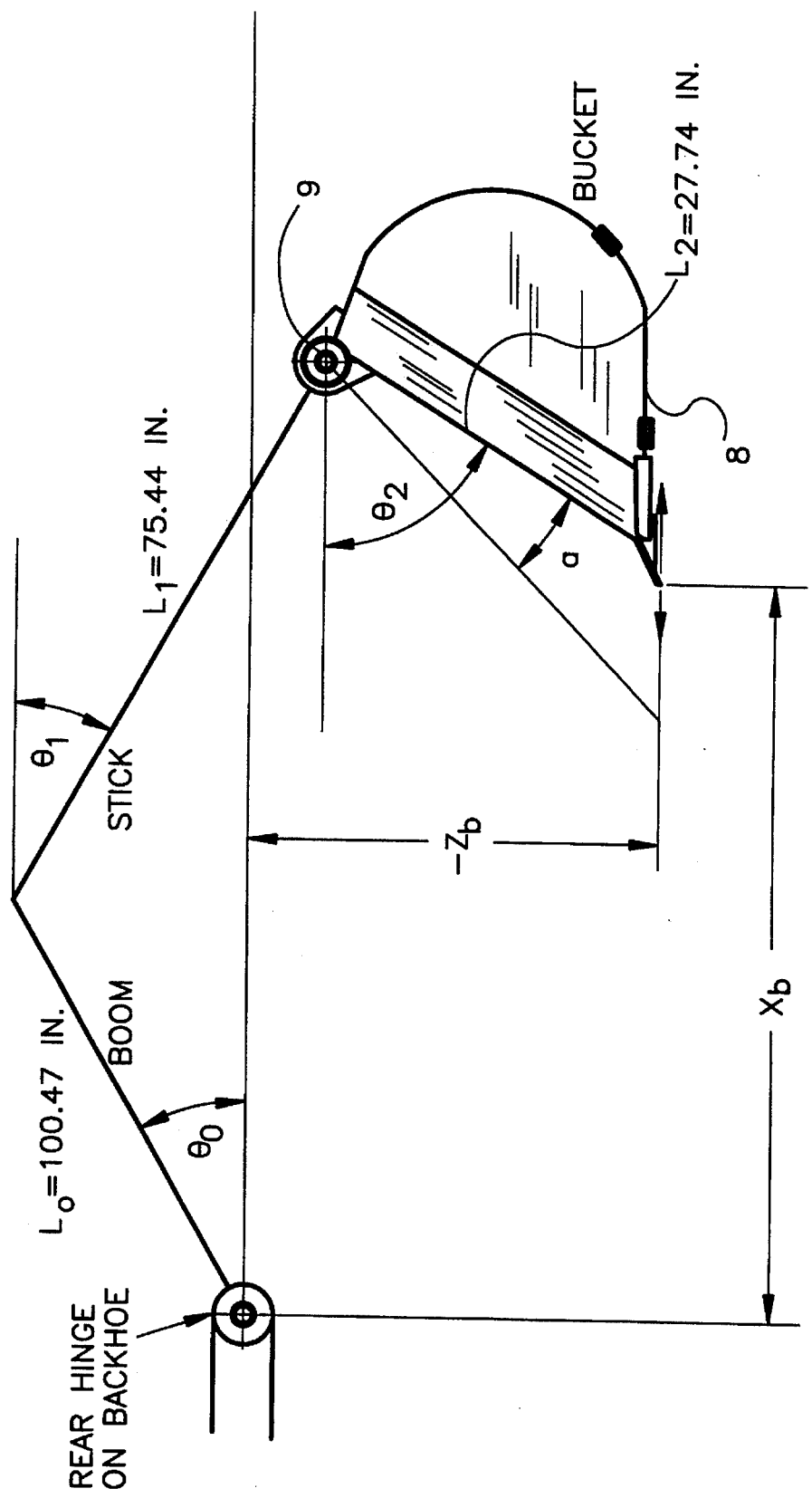
FIG. 10 is a diagram of various angles and distances for the cross-line case.

The variables involved in the determination of the distance to the trace wire 4 are shown in FIG. 10. In this figure, $L_0$ and $\theta_0$ represent the length and angle of the boom with respect to the horizontal plane, $L_1$ and $\theta_1$ represent the length and angle of the stick with respect to the horizontal plane, and $L_2$ represents the radial distance from the center of the bucket 8 to the location of the forward sensor 6' projected to the side of the bucket 8, and $\theta_2$ represents the angle formed by that radius with respect to the horizontal plane.

From the geometry of the relationships, the lateral distance $x_b$:

$$x_b = L_0 \cos\theta_0 + L_1 \cos\theta_1 - L_2 \cos\theta_2 \qquad \text{(EQ. 9)}$$

and the vertical distance $z_b$ can be determined as follows:

$$z_b = L_0 \sin\theta_0 - L_1 \sin\theta_1 - L_2 \sin\theta_2 \qquad \text{(EQ. 10)}$$

The distances $x_b$ and $z_b$ are determined in real-time and are measured with respect to the rear hinge 9 of the backhoe 5. The geometry tracker 74 may establish a pair of axes that are defined as follows:

$$x_i = x_b - x_m \qquad \text{(EQ. 11)}$$

and $$z_i = z_b - z_m \qquad \text{(EQ. 12)},$$

where $x_i$ and $z_i$ are coordinates displayed on the front display 76 and $x_m$ and $z_m$ are coordinates that can be set manually by the operator to establish a translated frame of coordinates with the origin at any point. Thus, after locating the position of the trace wire 4, the values of $x_m$ and $z_m$ may be set so that the zero points for the values of $x_i$ and $z_i$ coincide with the location of the wire 4.

The angles $\theta_0$, $\theta_1$, and $\theta_2$ are measured with three separate inclinometers that are attached to the boom, stick, and bucket 8. The data from the inclinometers are transmitted over a suitable cable to the geometry tracker 74. The inclinometers are preferably a capacitance based unit that is manufactured by Lucas Sensing Systems, Inc. The inclinometer comprises two a stable multi-vibrators that act to produce a output pulse whenever a trigger pulse is applied to the inclinometer. The duration of the output pulse is proportional to the angle and a separate output from the inclinometer indicates whether the angle is positive or negative.

Figure 11:
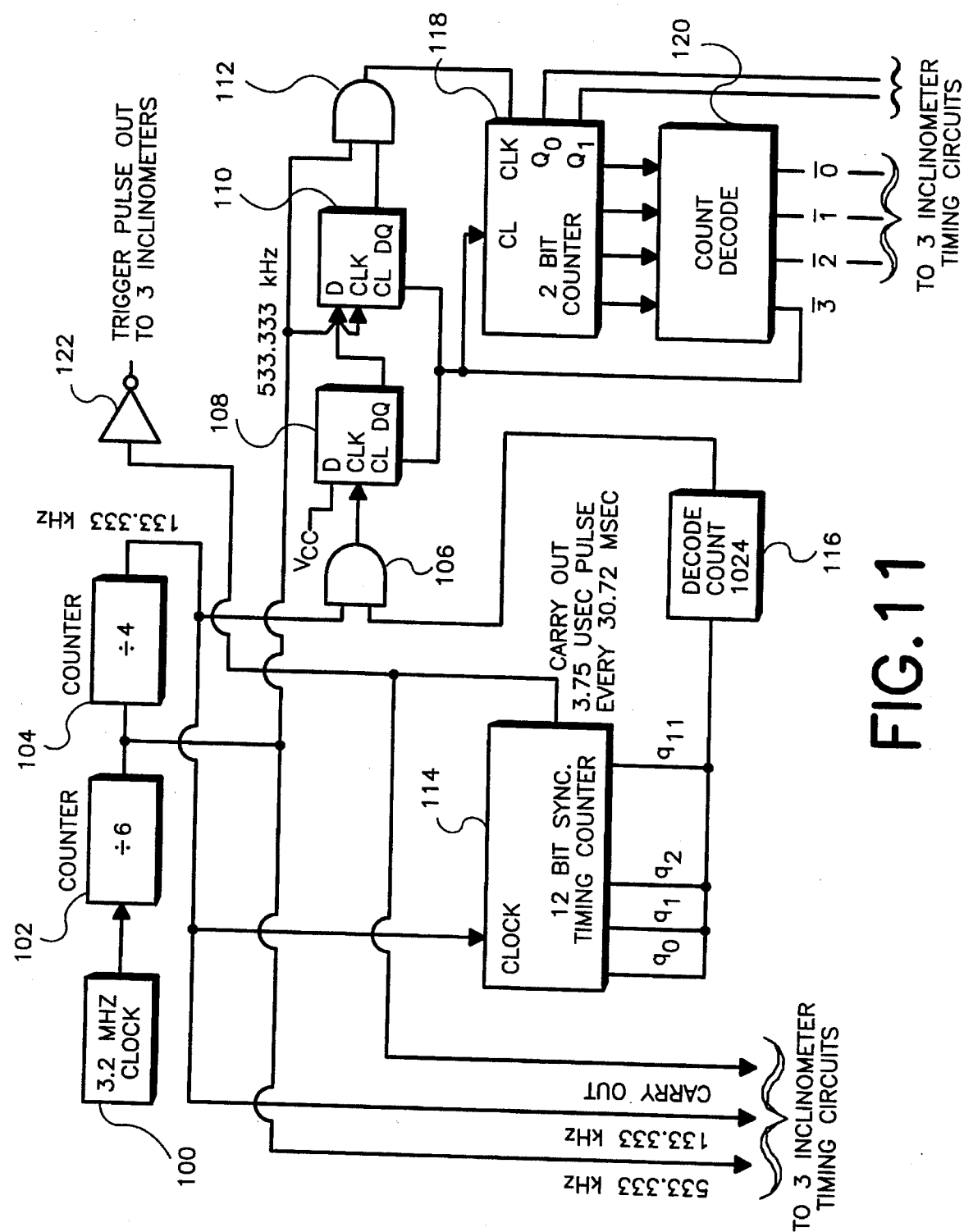
FIG. 11 is a preferred circuit schematic of a timing circuit for the cross-line case.

With reference to FIG. 11, a timing circuit comprises a 3.2 MHz clock 100 that is divided by 6 and then again by 4 by respective frequency dividers 102 and 104. The signal output by frequency divider 104 has period of 7.5 μs, which is equal to 1/8th the time period for one degree. A 12-bit synchronous timing counter 114 coordinates the timing of various events in the timing circuit. The carry-out from the 12-bit counter 114 is passed through inverter 122 and is supplied to the three inclinometers as the trigger signal. Upon receipt of the trigger signal, the inclinometers immediately produce a pulsed output corresponding to the present angle.

A decoder 116 produces an output signal upon the detection of a count of 1024 from the 12-bit counter 114. The count of 1024 is sufficiently long for the inclinometers to have already terminated their pulsed output and is therefore used to initiate a transfer of the measured angle. The output of the decoder 116 is passed through AND gate 106 along with the 133.33 kHz signal from frequency divider 104 in order to remove spurious signals. The output of the AND gate 106 is then passed through flip-flops 108 and 110 and gate 112 to edge-align and synchronize the signal with the 533.333 kHz signal from frequency divider 102.

The output of AND gate 112 functions as a clock signal for a 2-bit counter 118. The output of the 2-bit counter 118 is supplied to the inclinometer timing circuits and are also supplied to a decoder 120, which supplies the complements of the 0, 1, and 2 counts to the inclinometer timing circuits. The count of 3 from the 2-bit counter 118 resets the flip-flops 108, 110, and the two-bit counter 120.

Figure 12:
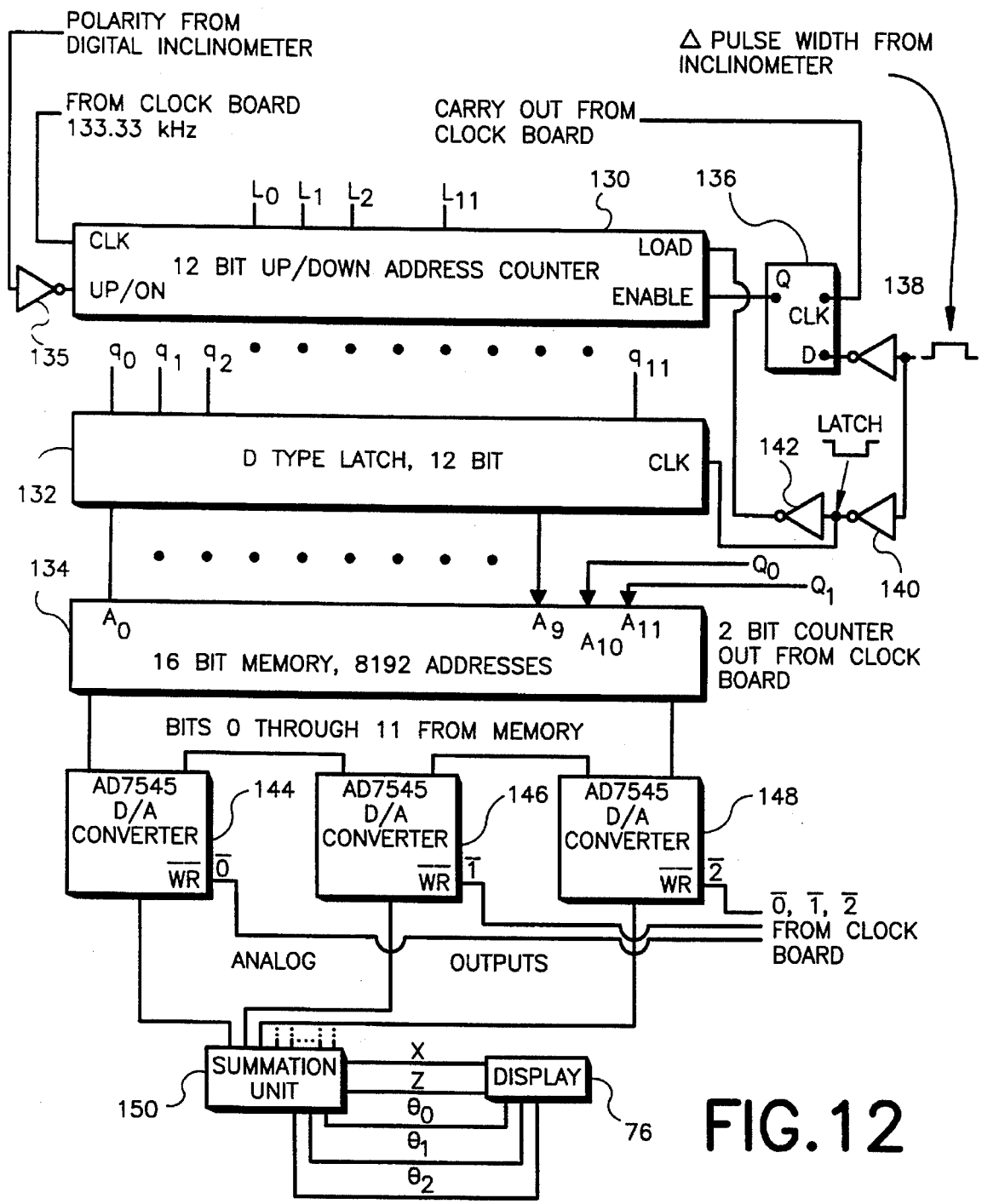
FIG. 12 is a preferred schematic of a circuit for measuring angles and for determining distances to a trace wire for the cross-line case.

Each of the inclinometers for the boom, stick, and bucket 8 has an inclinometer timing circuit, a preferred embodiment of which is shown in FIG. 12. The inclinometer timing circuit comprises a 12-bit up/down address counter 130 that receives the 133.33 kHz clock signal and, consequently, provides a resolution of 1/8th of a degree. The counter 130 can be loaded with a specified count and will count either up or down depending upon the polarity of the second signal from the inclinometer.

Additionally, the counter 130 only counts when an enable signal is received from a D flip-flop 136. A clock input to the D flip-flop 136 receives the trigger signal from the timing circuit of FIG. 11. The pulsed signal from the inclinometer is passed through inverter 138 and supplied to the input of D flip-flop 136. Thus, the D flip-flop 136 will generate the enable signal for a time period equal in duration to the pulse width of the inclinometer signal.

Prior to the application of the enable signal, the counter 130 has been pre-loaded with a specified count. Preferably, the pre-loaded count is set to a mechanical angle which corresponds to a zero duration pulse out of the inclinometer. Approximately 25 nanoseconds before the inclinometer generates the signal with the pulse width proportional to the angle, the inclinometer generates the up/down signal which is passed through inverter 135 and input to the counter 130. The counter 130 proceeds to count either up or down during the duration of the enable signal, and therefore counts the duration of the inclinometer signal's pulse width.

When the pulsed signal from the inclinometer drops down to a logical value of "0" at the end of the pulse width, the enable signal is no longer supplied to the counter 130 and the contents of the counter 130 are loaded into the 12-bit latch 132. The output from the latch 132 is supplied to a 16-bit memory 134 as address lines $A_0$ to $A_9$. The outputs from the 2-bit counter 118 are supplied to three D/A converters 144, 146, and 148 and to the address lines $A_{10}$ and $A_{11}$.

With reference above to Equations 9 and 10, in addition to the angle $\theta_m$, the values of $L_m \cos\theta_m$ and $L_m \sin\theta_m$ must also be known to determine the location of the trace wire 4. The outputs from the 2-bit counter 118 are used to address three separate areas of memory within 16-bit memory 134. When both outputs $Q_0$ and $Q_1$ from the 2-bit counter 118 are both at a logical value of "0," the output from the latch 132 addresses a value for the angle $\theta_m$. With both outputs from the 2-bit counter 118 at a logical value of "0," only D/A converter 144 is latched with the data from memory 134 and thus only D/A converter 144 converts the digital value of $\theta_m$ into an analog value.

When the $Q_0$ and $Q_1$ outputs from the 2-bit counter 118 are respectively at logical values of "1" and "0," a value for the variable $L_m \cos\theta_m$ is output by the memory 134 and only D/A converter 146 is latched with the data from memory 134. Therefore, only D/A converter 146 outputs an analog value for this variable. Finally, when the $Q_0$ and $Q_1$ outputs from the 2-bit counter 118 are respectively at logical values of "0" and "1," a value for the variable $L_m \sin\theta_m$ is output by the memory 134 and only D/A converter 148 outputs an analog value for this variable.

The values stored in memory 134 are preferably corrected to reflect experimentally measured values for the angle $\theta_m$. Also, an index angle is preferably added to the measured value before being in stored in memory 134. The index angle for the boom, for example, was chosen as 45° and the inclinometer was mounted so that the inclinometer produces a zero pulse width at the angle of 45°. The index values for the stick and boom, for example, are 55° and 65°, respectively.

The values stored in memory 134 are also preferably stored in an offset binary format. A binary value is added to the data before being stored in memory 134 so as to force the minimum value of the data over the entire range of values to be equal to zero. As a result, the stored values for the angle $\theta_m$ range from 0 to 4095. The offset binary value is then subtracted out during the read-out operation so as to restore the data to the proper value of the angle $\theta_m$.

The outputs from the D/A converters 144, 146, and 148 are supplied to a summation unit 150. The summation unit 150 executes the calculations in Equations 9 and 10 and therefore receives from the six D/A converters the horizontal and vertical components of the angles for the boom, stick, and bucket 8. From these six values, the summation unit 150 calculates the values of x and z and provides the values of x and z to the display 76. The summation unit 150 also receives the values of the angles $\theta_0$, $\theta_1$, and $\theta_2$ for the boom, stick, and bucket 8, respectively, and supplies the values for these angles to the display 76.

The first step with the cross-line digging operation is the determination of the horizontal position x of the trace wire 4. The horizontal position x of the trace wire 4 may be found by locating the position where the voltage output from the forward sensor 6' is a maximum. As the strength of the signal from the forward sensor 6' varies with the vertical distance from the trace wire 4 and also with the bucket angle 8, the process of determining the peak value should be performed as close as possible to the ground and at a constant bucket angle.

Figure 13:
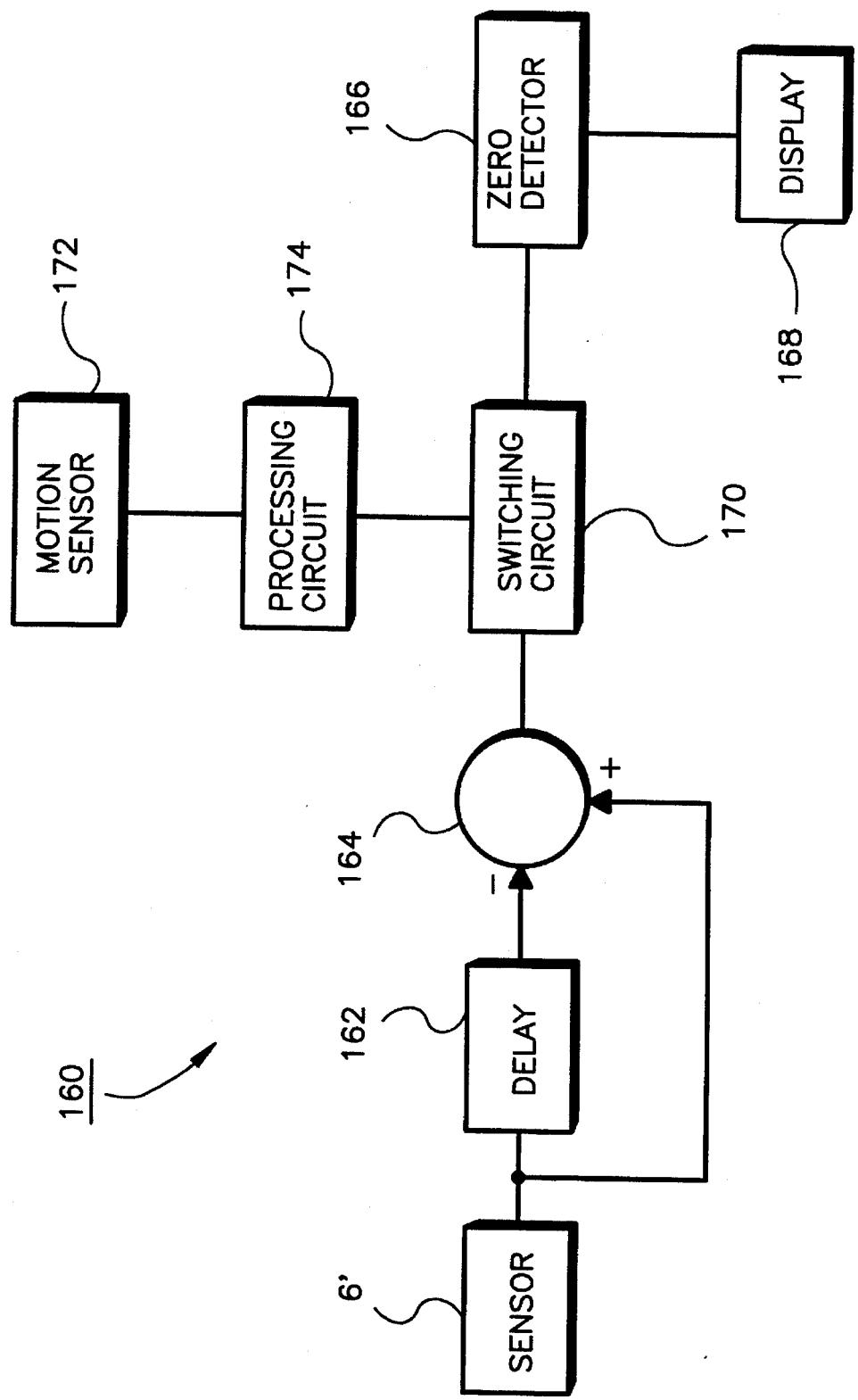
FIG. 13 is a block diagram of a peak detector.

A first embodiment of a peak detector 160 for automatically indicating the location of the horizontal position x of the trace wire 4 is depicted in FIG. 13. The signals from the forward sensor 6' are input to a delay circuit 162 and also to an adder circuit 164. The adder circuit 164 determines the difference between a present value of the sensor 6' output with a previous value of the sensor 6' which has passed through delay 162. A zero detector circuit 166 detects when the difference between the present value and previous value of the sensor 6' output is equal to zero, thereby indicating the horizontal position x of the trace wire 4. A display 168 provides an indication to an operator of the horizontal position of the trace wire 4 and may additionally provide an audible warning that the bucket 8 is approaching the horizontal position x of the trace wire 4.

The peak detector 160 is operable to detect the horizontal position x of the trace wire 4 only when the forward sensor 6' is being moved along the x axis. When the forward sensor 6' is stationary, however, the output from the forward sensor 6' would be constant and the peak detector 160 would erroneously indicate the horizontal position of the trace wire 4. Consequently, the peak detector 160 must be operable only when the bucket 8 is being moved along the x axis.

One manner in which to prevent the peak detector 160 from erroneously indicating the position of the trace wire 4 is to use a motion detector 172, a processing circuit 174, and a switching circuit 170. The processing circuit 174 converts a motion signal from the motion sensor 172 into a binary value to thereby indicate motion or no motion. The switching circuit 170 supplies the signal from the adder 164 to the zero detector 166 when the processing circuit 174 indicates motion and supplies a positive voltage to the zero detector 166 when the forward sensor 6' is stationary. As a result, the peak detector 160 cannot indicate the occurrence of the trace wire 4 when the sensor 6' is motionless.

The motion detector 172, for example, may comprise any suitable detector capable of sensing motion of the bucket 8 along the x axis. As an example, the motion detector 172 may comprise a flow meter that monitors the flow of hydraulic fluid. The processing circuit 174, for example, may comprise a Schmidt trigger with other suitable circuitry for clamping the value of the motion signal at a logical value of "1" when the motion sensor 172 senses motion and for clamping the value of the motion signal at a logical value of "0" when motion is not detected. The switching circuit 170, for example, may comprise a single pole double throw relay having the fixed end of the pole attached to the zero detector 166. The movable end of the pole is connected to the adder 164 when motion is detected and is connected to a reference potential when motion is not detected. The switching of the relay may be controlled on the basis of a current travelling from the processing circuit 170 through a suitable load, such as a resistor, to ground.

In operation, when motion is sensed by the motion sensor 172, the processing circuit 174 outputs a logical value of "1" to cause a current to flow through the resistor to ground. The relay senses the current and switches the movable end of the pole to the output of the adder 164, thereby connecting the adder 164 directly to the zero detector 166. On the other hand, when motion is not sensed, the processing circuit 174 outputs a logical value of "0" and no current is caused to flow through the resistor. The movable end of the pole is then thrown to connect the zero detector 166 to the reference potential.

Figure 14:
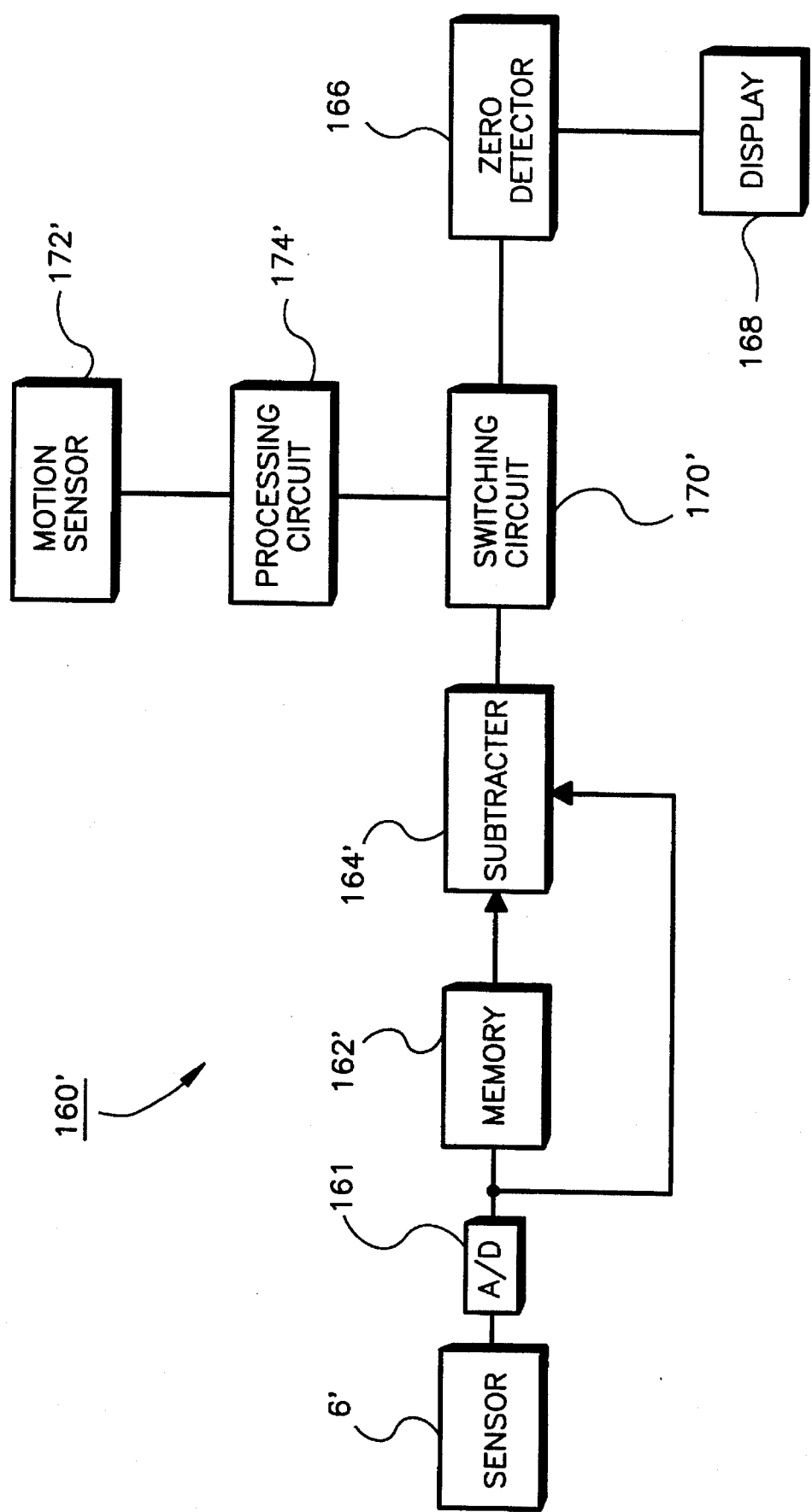
FIG. 14 is a second embodiment of a peak detector.

A second embodiment of the peak detector 160' is shown in FIG. 14. In this embodiment, the signals from the forward sensor 6' are converted into digital values with A/D converter 161 and are then supplied to a subtractor 164' and to a memory 162'. The memory 162' introduces an appropriate delay by the storage and retrieval times associated with the memory 162'. The switching circuit 170' in this embodiment introduces a suitable digital value to the zero detector 166' when motion is not detected.

Rather than locating the horizontal position x by detecting the maximum value for the forward sensor 6', the horizontal position x may be determined by finding two locations where the signals from the sensor 6' are equal. The signal strength of the sensor 6' is the same value at equal distances to the trace wire 4. Thus, the location of the trace wire 4 can be determined as the midpoint between two locations where the signals from the sensor 6' are equal in magnitude.

The vertical position z of the trace wire 4 may be determined after the horizontal position x of the trace wire 4 has been determined. The bucket 8 is positioned over the trace wire 4 and the vertical position z may be calculated using Equation 4. In this equation, σ represents the ratio of voltages from the two sensors 6' and d represents the vertical distance between the two sensors 6', both of which are quantities that can be measured on the bucket 8.

In operation, the pipe proximity warning device according to the invention has been used to detect a 10 mA signal on the trace wire 4. The operator of the backhoe 5 is able to detect the direction and course of the wire 4 and is also able monitor the distance to the wire 4 through use of displays 16 and 76. The pipe proximity warning device provides the distances in real-time with highly accurate results. Because the errors in the results are on the order of only a few inches, the amount of digging that must be performed by hand is minimized and the efficiency of the overall operation is maximized.

In addition to increasing the efficiency of the digging operation, the pipe proximity warning device according to the invention is also able to increase the safety of the digging operation. The operator of the backhoe 5 is able to accurately monitor the distance and direction to the trace wire 4 and can operate the backhoe 5 with confidence that the digging operation will not damage the wire 4 or plastic gas lines 2. The pipe proximity warning device is also safe in that the operator does not have to remember the location of the wire 4 but may instead rely on the displays 16 and 76 to indicate the distance and direction to the wire 4.

As another advantage, the pipe proximity warning device according to the invention is able to provide accurate and consistent results with varying magnitudes of signals on the trace wire 4. The device is able to operate effectively with varying magnitudes of signals because the device normalizes the signals by taking a ratio of the outputs from sensors.

The foregoing description of the preferred embodiments of the invention has been presented for purposes of illustration and description. It is not intended to be exhaustive or to limit the invention to the precise forms disclosed. Many modifications and variations are possible in light of the above teaching. It should be understood, that while the foregoing description of the system operations is quite extensive, in practice the backhoe operator relies upon the electronic portion of the systems to perform and calculations with the results being displayed in the cab.

For example, the invention could be implemented in a more simple operator-assisted system comprising a single magnetic housing enclosing two cores positioned to accommodate the in-line and cross-line flux directions respectively . For the in-line situation, the core would be sensitive to flux tangential to the bottom of the bucket and directed across the width of the bucket. The core would be sensitive to flux tangential to the bottom of the bucket and directed across the length of the bucket for the cross-line situation. The appropriate core would be selectable through a remote switch controlled by the operator. The magnetic housing would be located on the bottom of the bucket along its length and near the cutting edge.

With this system, the operator could maneuver the bucket directly over the trace wire by monitoring the maximum level of the sensor's output. To determine the depth of the wire, the bucket would be placed on the ground at a standard angle and the value of the sensor's output would be set to a unit value. The bucket would then be raised until the value of the sensor's output is at one half the unit value. The depth of the wire below the surface would then be a known multiple of the observed distance above the ground. The known multiple is typically set to one so that the trace wire 4 is buried beneath the surface at a distance equal to the observed distance.

As another example, the invention could be implemented in a system having two sensor housings both of which enclose two orthogonal coils that are switch selectable for the in-line and cross-line cases. The system would include a dual channel processing circuit and a single inclinometer for the bucket. The inclinometer would provide the angle of the bucket and would also provide addressing information to a voltage to depth converter. The voltage to depth converter would have two memory units respectively for the cross-line case and in-line case and would provide values for $\alpha$, $\beta$, and $\gamma$.

As a third example, the invention could be implemented in a system having a single sensor but which provides a dynamic display of bucket-to-trace wire geometry. The magnetic sensor housing would contain two orthogonal coils that could be switched for either the cross-line case or the in-line case. A geometry tracker would receive inputs from inclinometers for the boom, stick, and the bucket.

The lateral position of the wire would be inferred from the amplitude of the sensor output signal as the bucket was moved horizontally over the wire. The depth determination would require an initial estimate based on two measurements of signal level measured directly over the wire and separated by a known distance. The system would store the first value and calculate the vertical distance to the wire after being moved a known vertical distance away from the wire. The geometry tracker could then provide a dynamic display of the bucket's edge with respect to the trace wire.

While the invention has been described with reference to a system for locating a trace wire 4 associated with plastic gas pipelines 2, the invention could also be used to locate other types of field generating devices. For example, the proximity detector could be used to indicate the distance to a power line, cable line, phone line, as well as other types of communication lines that produce magnetic fields. Moreover, rather than detecting magnetic fields, the proximity detector could be used to detect electric fields and to determine the distance and direction to a device producing the electric fields.

Also, the invention is not limited to a backhoe 5 or other objects that perform work under the surface of the ground but may be embodied in an object that operates underwater. For instance, the invention may be embodied in an object that operates in the vicinity of underwater cables.

Furthermore, while the invention has been used in situations where an operator is unable to determine visually the location of a wire, the invention may also be used in applications where the wire is not hidden from view. For instance, the invention may be used in an object, such as a tree trimming device, that operates in the vicinity of overhead cables. In such a situation, the invention could disable a cutting operation that would damage the overhead cables and could warn an operator that the cutting operation is occurring in the vicinity of the overhead cables.

The locating system of the invention provides a display of the distance and direction from the backhoe 5 to the wire 4 with accuracy on the order of just a few inches. After the operator of the backhoe 5 has aligned the backhoe 5 to perform either the in-line dig or the cross-line dig, the locating system provides the distance and direction to the wire 4 in real-time without any further input from the operator.

As discussed above, the locating system calculates a ratio of the two sensor output signals and consequently determines the distance and direction to the wire independent of the proportionality constant. By taking a ratio of the two signals, the locating system can accurately determine the distance to the wire without regard to the magnitude of signals on the trace wire.

In addition to determining the distance to the trace wire, the locating system also determines and displays in real time the direction from the backhoe 5 to the trace wire 4. As a result, the operator can perform the digging operation more efficiently than prior detectors since the operator of the invention can direct the digging operation to avoid the trace wire 4. Also, when an alarm is sounded thereby indicating that the bucket 8 is within a certain distance to the wire 4, the direction to the wire 4 is known and any further digging need not explore the surrounding area in order to discover the location of the wire 4. Consequently, the digging operation is performed more efficiently.

The embodiments were chosen and described in order to explain the principles of the invention and their practical application to thereby enable others skilled in the art to utilize the invention and various embodiments and with various modifications as are best suited to the particular use contemplated. It is intended that the scope of the invention only be limited by the claims.

We claim:

1. A locating system for use with a backhoe operating in the vicinity of a wire generating a magnetic field for locating the wire and for preventing the wire from becoming damaged, comprising:

a first sensor mounted on a bucket of said backhoe for detecting said magnetic field and for producing a first sensor output signal;

a second sensor mounted on said bucket of said backhoe a predetermined distance from said first sensor for detecting said magnetic field and for producing a second sensor output signal;

processing means for locating said wire by receiving said first sensor output signal and said second sensor output signal and determining the distance from said backhoe to said wire, wherein said processing means receives a signal representing an angle of said bucket and determines said distance to said wire based upon the following equation:

$$z = \gamma\sigma^2 + \beta\sigma + \alpha$$

where $\sigma$ is the ratio of said first sensor output signal to said second sensor output signal and $\alpha$, $\beta$, and $\gamma$ are constants unique for the bucket angle; and means for indicating said distance and direction from said backhoe to said wire.

2. The system as set forth in claim 1, wherein said indicating means comprises a depth display for indicating a depth of said wire.

3. The system as set forth in claim 1, further comprising means for disabling said backhoe when said backhoe comes within a predetermined distance to said wire.

4. The system as set forth in claim 1, wherein said first sensor and said second sensor are aligned to detect said field from said wire when said backhoe is performing an in-line digging operation.

5. The apparatus as set forth in claim 1, wherein said first sensor and said second sensor each comprise:

a core material;

a plurality of turns of wire wrapped around said core material; and a sensor housing, said sensor housing comprising:

a lower housing portion forming a bottom wall of said sensor housing and having four side walls; and an upper housing portion forming a top wall of said sensor housing and having four side walls, said four side walls of said upper housing portion mating with said four side walls of said lower housing portion to form four side walls of said sensor housing;

said sensor housing being fabricated from a material having a permeability approximately equal to 1.0 and wherein said upper housing portion is insulated from said lower housing portion.

6. The apparatus as set forth in claim 1, wherein said first sensor and said second sensor are aligned to detect said field from said wire when said backhoe is performing a cross-line digging operation.

7. The apparatus as set forth in claim 6, wherein said second sensor comprises:

a plastic bobbin;

a plurality of turns of wire wrapped about said plastic bobbin;

a core material inserted within a center of said plastic bobbin; and a sensor housing for enclosing said plastic bobbin, said turns of wire, and said core material;

wherein said sensor housing is fabricated from a material having a permeability approximately equal to 1.0.

8. The apparatus as set forth in claim 6, further comprising means for tracking said distance to said field generating device based upon said first sensor output signal, said second sensor output signal, an angle of a bucket of said backhoe, an angle of a boom of said backhoe, and an angle of a stick of said backhoe.

9. The apparatus as set forth in claim 8, further comprising a ranging system for disabling said tracking means when said bucket is outside a certain distance to said field generating device.

10. The apparatus as set forth in claim 1, wherein said processing means comprises:

an inclinometer mounted to said bucket for generating a pulsed output signal having a pulse width proportional to an angle of said bucket;

means for generating a clock signal; and means for counting pulses from said clock signal during said pulsed output signal and for producing a digital signal representing said bucket angle.

11. The apparatus as set forth in claim 10, further comprising a second inclinometer for a boom of said backhoe and a third inclinometer for a stick of said backhoe.

12. The apparatus as set forth in claim 10, further comprising a memory receiving said digital signal and producing a first signal representing said angle at a first timing, a second signal representing said angle multiplied by a first sinusoidal value at a second timing, and a third signal representing said angle multiplied by a second sinusoidal value at a third timing.

13. The apparatus as set forth in claim 1, further comprising a peak detector for determining said distance from said backhoe to said wire.

14. The apparatus as set forth in claim 5, wherein said sensor core material comprises ferrite.

15. The apparatus as set forth in claim 5, wherein said sensor core material and said turns of wire are encapsulated within silicon rubber.

16. The apparatus as set forth in claim 5, wherein a flange is formed on each of two side walls of said upper housing portion which are opposite each other and which are parallel to flux lines generated by a field generating device.

17. The system as set forth in claim 1, wherein said processing means comprises a memory for storing values of said constants $\alpha$, $\beta$, and $\gamma$ for a range of values of the bucket angle.

18. A method for determining a location of a wire generating a magnetic field by determining a distance from a backhoe to a wire for preventing said wire from becoming damaged, comprising the steps of:

detecting at a first location on a bucket of said backhoe a field generated by said wire and producing a first sensor output signal;

detecting at a second location on said bucket of said backhoe a field generated by said wire and producing a second sensor output signal;

using processing means to receive a signal representing an angle of the bucket and determining said distance from the backhoe to said wire based upon the ratio $\sigma$ of said first sensor output signal to said second sensor output signal and the angle of the backhoe, using the equation $z=\gamma\sigma^2+\beta\sigma+\alpha$ where $\alpha$, $\beta$ and $\gamma$ are constants unique for the bucket angle.

19. The method as set forth in claim 18, further comprising the step of disabling said object when said distance from said object to said field generating device is less than a predetermined distance.

20. The method as set forth in claim 18, further comprising the step of displaying a depth of said object.

21. The method as set forth in claim 18, wherein said object comprises a backhoe and said method further comprises the steps of receiving a first angle signal representing an angle of a bucket of the backhoe, receiving a second angle signal representing an angle of a stick of the backhoe, and receiving a third angle signal representing an angle of a boom of the backhoe.

22. A locating system for use with a backhoe operated in the vicinity of a device which generates a field for locating the field generating device and for preventing said field generating device from becoming damaged, comprising:

a first sensor mounted on the backhoe for detecting said field generated by said field generating device and for producing a first sensor output signal;

a second sensor mounted on said backhoe a predetermined distance from said first sensor for detecting said field from said field generating device and for producing a second sensor output signal;

wherein said first sensor and said second sensor are aligned to detect said field from said field generating device when said backhoe is performing a cross-line digging operation;

processing means for locating said field generating device by receiving said first sensor output signal and said second sensor output signal and determining the distance from the backhoe to said field generating device based upon the ratio of said first sensor output signal to said second sensor output signal;

means for indicating said distance from said backhoe to said field generating device;

means for tracking said distance to said field generating device based upon said first sensor output signal, said second sensor output signal, an angle of a bucket of said backhoe, an angle of a boom of said backhoe, and an angle of a stick of said backhoe;

a ranging system for disabling said tracking means when said bucket is outside a certain distance to said field generating device.

23. A locating system for use with a backhoe operating in the vicinity of a wire generating a magnetic field for locating the wire and for preventing said wire from becoming damaged, comprising:

a first sensor mounted on a bucket of said backhoe for detecting said field generated by said wire and for producing a first sensor output signal;

a second sensor mounted on said bucket of said backhoe a predetermined distance from said first sensor for detecting said field from said wire and for producing a second sensor output signal;

processing means for locating said wire by receiving said first sensor output signal and said second sensor output signal and determining the distance from the backhoe to said wire based upon a ratio of said first sensor output signal to said second sensor output signal, said processing means comprising an inclinometer mounted to said bucket for generating a pulsed output signal having a pulse width proportional to an angle of said bucket, means for generating a clock signal, and means for counting pulses from said clock signal during said pulsed output signal and for producing a digital signal representing said bucket angle; and means for indicating said distance and direction from said backhoe to said wire.

24. The system as set forth in claim 23, further comprising a second inclinometer for a boom of said backhoe and a third inclinometer for a stick of said backhoe.

25. The system as set forth in claim 23, further comprising a memory receiving said digital signal and producing a first signal representing said angle at a first timing, a second signal representing said angle multiplied by a first sinusoidal value at a second timing, and a third signal representing said angle multiplied by a second sinusoidal value at a third timing.

* * * * *